United States Patent
Mauer et al.

(10) Patent No.: US 6,338,601 B1
(45) Date of Patent: Jan. 15, 2002

(54) PUNCH RIVET, RIVETED JOINTS PRODUCED WITH IT, RIVETING TOOL AND METHOD OF PRODUCING A RIVETED JOINT

(75) Inventors: Dieter Mauer, Lollar; Robert Volnhals, Ingolstadt; Reinhold Opper, Alten-Buseck, all of (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/341,778

(22) PCT Filed: Jan. 12, 1998

(86) PCT No.: PCT/IB98/00032

§ 371 Date: Jul. 16, 1999

§ 102(e) Date: Jul. 16, 1999

(87) PCT Pub. No.: WO98/31487

PCT Pub. Date: Jul. 23, 1998

(30) Foreign Application Priority Data

Jan. 20, 1997 (DE) .......................... 197 01 780

(51) Int. Cl.$^7$ ................................. F16B 5/04
(52) U.S. Cl. ................... 411/503; 403/332; 29/525.06; 29/524.1; 29/432.2
(58) Field of Search ................. 403/332; 411/503, 411/502, 501; 29/525.06, 432.2, 524.1, 522.1, 243, 253, 254, 798

(56) References Cited

U.S. PATENT DOCUMENTS

| 133,737 A | * | 12/1872 | Wooten | 411/503 |
|---|---|---|---|---|
| 180,747 A | * | 8/1876 | Bray | |
| 2,361,770 A | * | 10/1944 | Huck | 411/501 |
| 2,465,534 A | * | 3/1949 | Havener | |
| 4,192,058 A | * | 3/1980 | Falcioni | |
| 4,817,264 A | * | 4/1989 | Worthing | |
| 5,722,144 A | * | 3/1998 | Bora | |
| 5,752,305 A | * | 5/1998 | Cotterill et al. | 29/432.2 |

FOREIGN PATENT DOCUMENTS

| DE | 28 39 838 A1 | | 5/1979 |
|---|---|---|---|
| DE | 39 42 482 C1 | | 1/1991 |
| DE | 4333052 A1 | * | 3/1995 |
| DE | 43 33 052 A1 | | 3/1995 |
| DE | 44 31 769 A1 | | 3/1996 |
| DE | 4431769 A1 | * | 3/1996 |
| GB | 537235 | * | 6/1941 |
| GB | 0 129 358 | * | 6/1984 |
| GB | 0 129 358 | * | 12/1984 |
| GB | PCT WO/98/01679 | * | 1/1998 |
| WO | WO-93/10925 | * | 6/1993 |
| WO | WO 93/10925 | | 6/1993 |
| WO | WO 95/09307 | | 4/1995 |
| WO | WO 98/01679 | | 1/1998 |

OTHER PUBLICATIONS

International Search Report dated Apr. 23, 1998 for PCT/IB98/00032.

* cited by examiner

Primary Examiner—Lynne H. Browne
Assistant Examiner—Tomlyne A Malcolm
(74) Attorney, Agent, or Firm—Edward D. Murphy

(57) ABSTRACT

A punch rivet (1) has a cutting edge (6) which is arranged on the end face of its rivet shank (2) and is formed in the cutting region by an outer face (5) extending parallel to the axis and a conical inner face (4) of the rivet shank (2). The outer face (5) extends continuously parallel to the axis over the entire rivet shank (2) and the punch rivet (1) is provided with the same cutting edges (6, 7) on either side in an axially symmetrical design in the form of a tube.

37 Claims, 7 Drawing Sheets

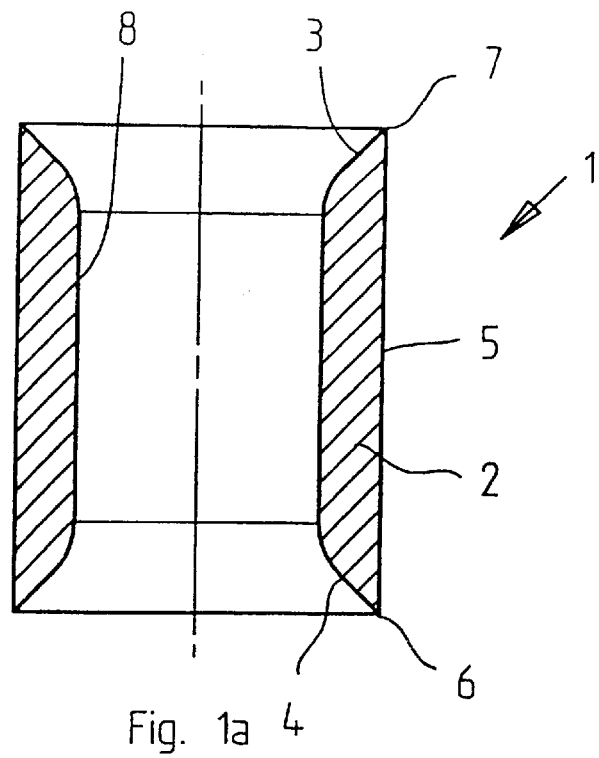
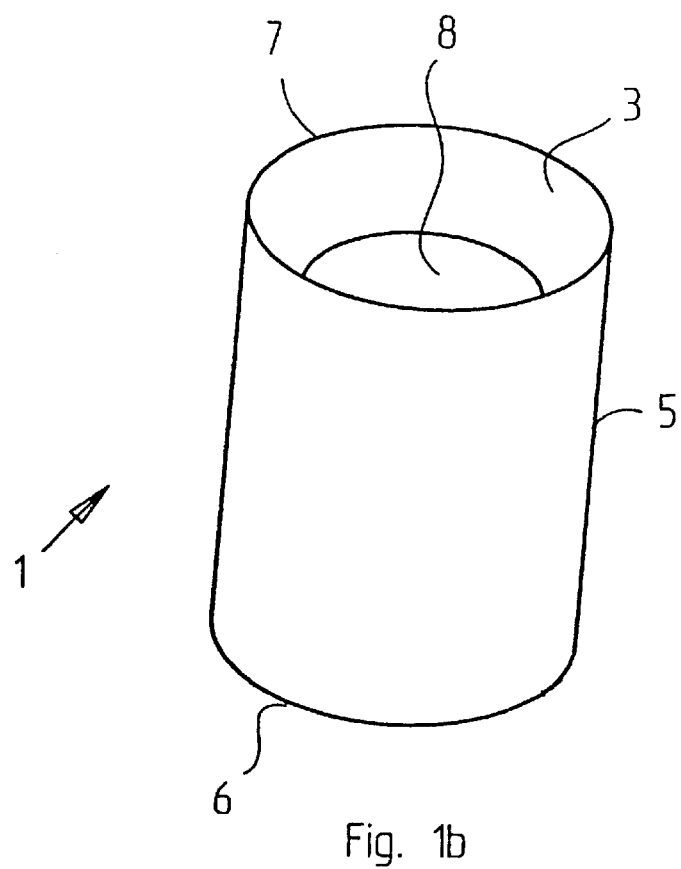

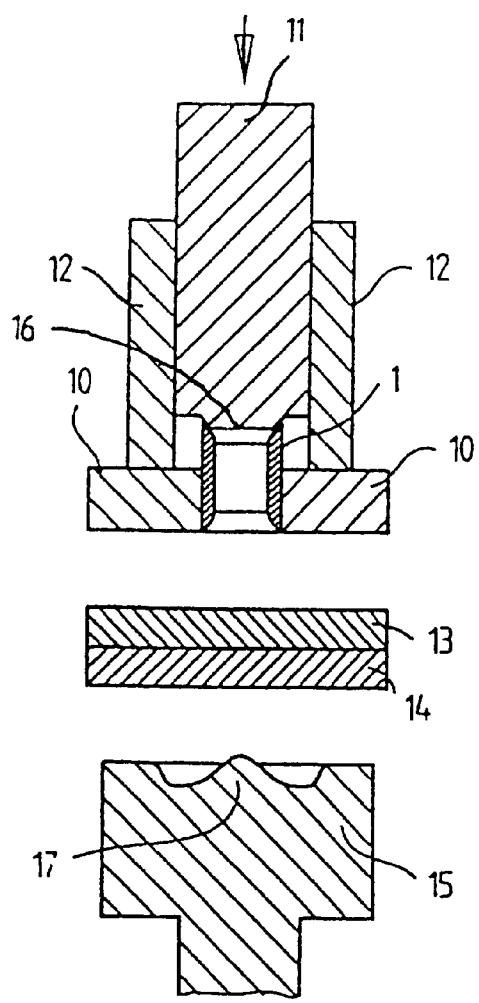
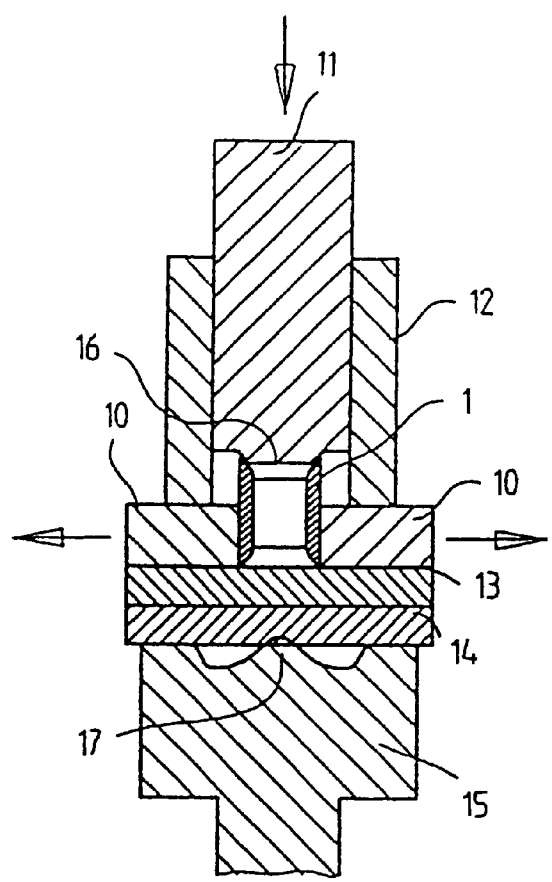
Fig. 3a
Fig. 3b

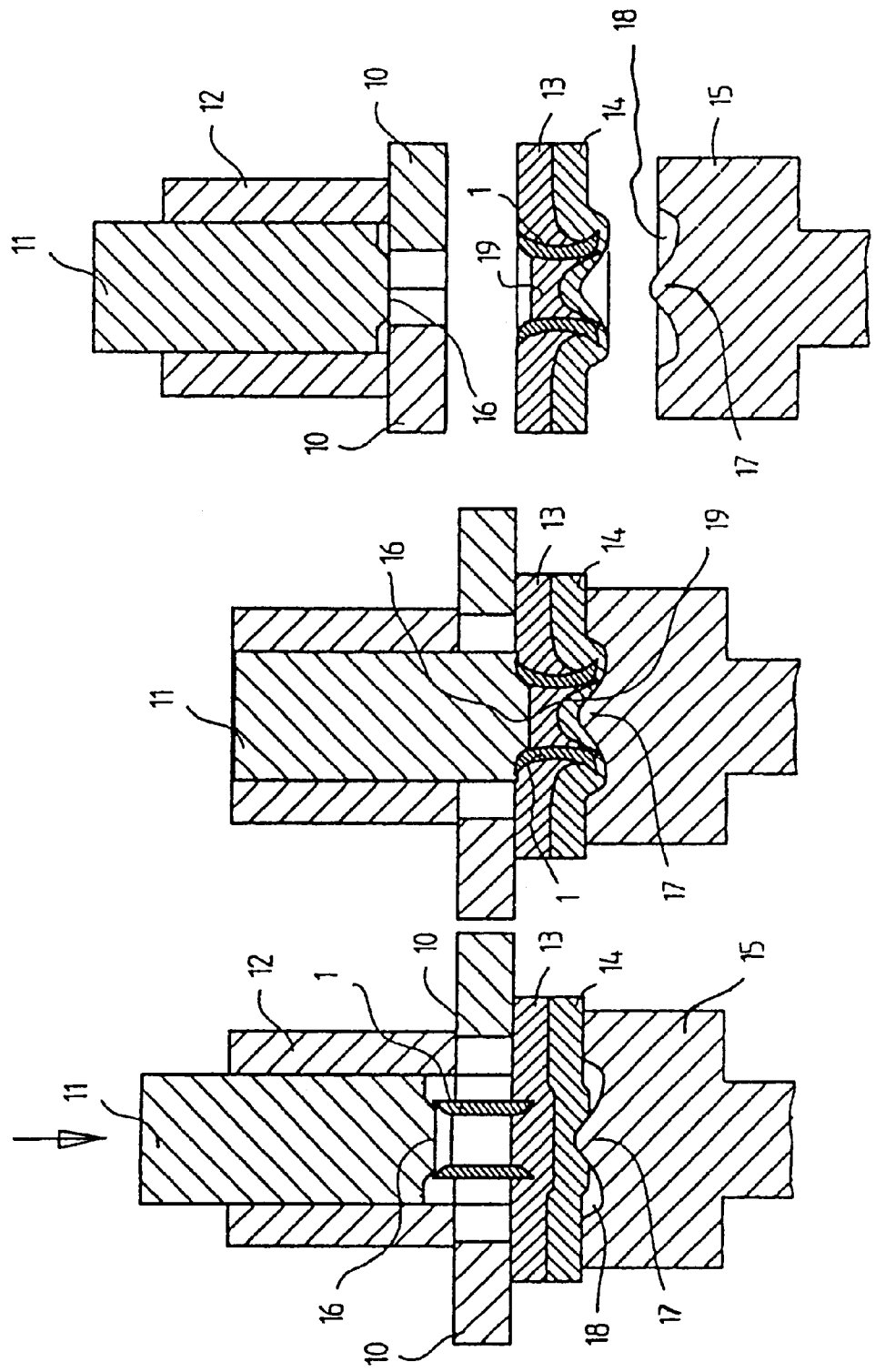

PUNCH RIVET, RIVETED JOINTS PRODUCED WITH IT, RIVETING TOOL AND METHOD OF PRODUCING A RIVETED JOINT

BACKGROUND OF THE INVENTION

The invention relates to a punch rivet with a cutting edge which is arranged on the end face of its rivet shank and is formed in the cutting region by an outer face extending parallel to the axis and a conical inner face of the rivet shank.

The invention also relates to a riveted joint produced with such a punch rivet, a tool suitable for this purpose and to a method of producing a riveted joint.

A punch rivet of the type described above is described and illustrated in DE-OS 43 33 052 and has, on its side remote from the cutting edge, that is its back, a plate-like countersunk head which closes the punch rivet with a plane lid on this side, the rim of the lid passing conically or in a rounded fashion into the outer face of the rivet shank on its side facing the cutting edge. The plane outer face of the lid is suitable for application of a ram during the riveting process which presses the punch rivet through the components to be riveted, the components facing the cutting edge, that is the upper components, being pierced by the punch rivet and the component remote from the cutting edge, that is the bottom component, receiving the cutting edge due to the effect of a cone which, as a projection of a die, is directed toward the hollow interior of the punch rivet and widens the cutting edge radially outwardly when the cutting edge penetrates the bottom component without the bottom component being pierced.

DE-PS 39 42 482 describes a similar design with a head which is rounded in the manner of a tallow-drop screw. The known design dealt with above is also disclosed in DE-OS 44 31 769 which explains the requirements of the punch rivet material, which are that the punch rivet must have the necessary hardness in the cutting edge region for punching through the upper components, but be highly deformable in the shank region in order to widen the rivet shank radially outwardly within the bottom component in the cutting edge region and therefore to effect riveting. The state of the art showing punch rivets with a covering head is extensive.

DE-PS 28 39 838 describes a fundamentally different design of a punch rivet which consists of a round, axially symmetrical, solid body terminated on both sides by a plane radial end face. The corner which is right-angled in cross section and with which the radial end faces pass into a relatively narrow cylindrical annular face serves as a cutting edge in this punch rivet. To rivet two superimposed metal sheets, the punch rivet is pressed through the sheets, the two sheets being punched without the punch rivet being deformed. Riveting is effected in that, after punching, the sheets are pressed together by the punch rivet held in the punched holes, are deformed radially inwardly owing to an indentation formed between the end faces of the punch rivet and penetrate into the indentation, the punch rivet being held by the sheets and securing them with its indentation. Apart from the fact that this punch rivet is based on a fundamentally different principle from the punch rivet described at the outset, as it is not deformed during production of a riveted joint, the known solid punch rivet with its indentation can exert only relatively low holding forces on the two superimposed sheets as the punch rivet allows only a relatively slight, radially inwardly directed deformation of the sheets into the indentation, so a riveted joint withstanding considerable forces cannot be produced with this known punch rivet.

Reference is finally made to a riveted joint which is disclosed in PCT specification WO 93/10925 and is based on the principle of pressing two superimposed sheets together with a ram into a die such that a common material eyelet with outward radial widening is produced without the sheets being punched. The ram attenuates the sheet material which expands radially in the process, an undercut in the die ensuring that one sheet is pressed into the undercut, the other sheet following this undercut and therefore being riveted to the other sheet. A sleeve which surrounds the ram and presses the sheets into the die with the ram can remain in the hollowed eyelet in order to stabilise it. The sleeve has, on its back, a narrow head which is obviously to increase the strength of the riveted joint. As the above-described riveted joint is based on the riveting of the two plates at the base of the passage, so that production of the riveted joint is not dependent on genuine punching of at least one sheet and pronounced deformation of the punch rivet, this known method of producing a riveted joint does not provide any starting point for the design of a punch rivet with which genuine punching and deformation of the punch rivet are effected during riveting.

SUMMARY OF THE INVENTION

It is an object of the invention to provide a punch rivet which has a particularly simple design eminently suitable for mass production and can advantageously be worked so as to produce stable, heavy-duty riveted joints.

The present invention provides a punch rivet with a cutting edge which is arranged on the end face of its rivet shank and is formed in the cutting region by an outer face extending parallel to the axis and a conical inner face of the rivet shank, characterised in that the outer face extends continuously parallel to the axis over the entire rivet shank and the punch rivet is provided with the same cutting edges on either side in an axially symmetrical design in the form of a tube.

The punch rivet according to the invention requires a smaller clinching force than a punch rivet having a lid-like head on the side remote from the cutting edge. This head prevents the respective side of the punch rivet from expanding when pressed onto the top component. For the punch rivet to act as a solid abutment with its head designed as a lid, it has to be pressed into the surface of the top component and this demands considerable forces. With the punch rivet according to the invention, on the other hand, which receives the punching pressure on its back, it is possible for the tubular punch rivet to expand radially on this side owing to the absence of a lid so it effectively claws in the top component and only has to be deformed by it to the extent of widening. Widening of the punch rivet on the side which receives the punching pressure is therefore particularly advantageous for processing of the punch rivet. During this widening of the back of the punch rivet, completely mutually adapted deformation of the respective part of the punch rivet and of the material of the top component occurs as the respective part of the punch rivet pushes the material of the top component forward to a certain extent during this deformation, producing an intimate connection between the respective part of the punch rivet and the top sheet metal part at this point. This considerably increases the strength of the riveted joint. The punch rivet is also distinguished in that, owing to its axially symmetrical design, its position does not have to be checked with respect to front and back, in particular during automatic supply to a processing station. During the riveting process, each side of the punch rivet can be used as its front, that is the side performing the punching process. This automatically also allows particularly simple production of the punch rivet as special features on either side do not have to be allowed for. Owing to its tubular symmetrical design, it can receive a punched out piece from either side. The design of the punch rivet with a cutting edge also on the back of the punch rivet where it is pressed against the components to be riveted by means of a tool affords the further advantage that the inner face which is also conical on this side of the punch rivet simplifies central introduction of a punching tool and simplifies the expansion thereof which occurs during the riveting process, owing to the material attenuation there. This part of the punch rivet is then placed on the material of the component to be riveted, smoothly with a uniform transition owing to the conicity of its inner face, without a special step being able to appear as it does not in fact exist.

The background publication "Stanznieten fügt umformend ohne Umlochen der Bleche" (Bänder Bleche Rohre 4-1993, pages 46–55, FIG. 9), illustrating the punch riveting process with the punch rivets dealt with at the outset, shows the pronounced effect of a cover-like head which prevents widening of the punch rivet at its back. It can be seen that a considerable free space remains beneath the head of the respective punch rivet after punching so an intimate connection between the back of the punch rivet and the upper component cannot be made. As already mentioned, this is avoided with the punch rivet according to the invention owing to its radial widening capability, so the desired intimate connection between the widened part of the punch rivet and the upper component required for special strength is achieved.

Overall, therefore, the punch rivet according to the invention had a number of technically significant advantages which set it apart from the state of the art in a convincing and surprising manner.

A particularly simple embodiment of the punch rivet is produced if its outer face is continuously cylindrical in design. This configuration also simplifies automatic supply of the punch rivet which can be grasped, furthermore, by a conventionally designed tool and pressed into the components to be riveted. Clamping of such a punch rivet with conventional grippers affords the additional advantage that the punch rivet can be exactly grasped axially on its cylindrical outer face, guaranteeing exact location and orientation thereof for the punching of the components. The exact application of the punch rivet onto the top component and the beginning of punching are crucial for correct performance of the punching process and of the riveting process.

The rivet shank can be axially corrugated in cross section. As a result, the punch rivet is held non-rotatably by the components to be riveted, in other words the riveted components can receive a high, opposingly acting torque without the riveted joint being released.

An advantageous configuration of the rivet shank is achieved if it is designed as a continuous tube. This is particularly advantageous as it simplifies production of the punch rivet. However, it is also possible to arrange a radial wall in the rivet shank between the cutting edges. This interrupts the permeability of the pipe, which is important if the opposing sides of the respective components are also to be sealed by the punch rivet.

The rivet shank can be produced from a rolled sheet metal blank with an axial butt joint. The butt joint can be narrow in design but can also leave open a slot. In this case, material from the components which are to be riveted penetrates into the slot during riveting and this prevents the punch rivet and therefore the riveted joint from twisting.

To achieve a certain degree of radial imperviousness, however, the butt joint can also be formed with an overlap.

To prevent the rivet shank from being pressed apart in the region of the butt joint in the case of a punch rivet with a rivet shank consisting of a rolled sheet metal blank, in particular during the riveting of relatively hard materials, the butt joint can advantageously be bridged by fasteners. Such fasteners can consist of widening projections which are inserted into correspondingly shaped recesses, provided with undercuts, on the opposing side of the butt joint. The assembly of the projections with the recesses produces a rigid connection between the respective longitudinal sides of the rivet shank along the butt joint so the butt joint cannot be pressed apart when being driven into the materials to be riveted.

Another method of twist prevention involves interrupting the cutting edges with recesses. The material of the lower component is then pressed into these recesses as the punch rivet is pressed through so the riveted punch rivet cannot be twisted relative thereto. At its back, the material of the top component is also pressed into the respective recesses during widening of the cutting edge at the back of the punch rivet so twisting is also prevented here and prevents twisting of all the components. The overall quality of the riveted joint is increased by this complete prevention of twisting.

A riveted joint between at least two plate-like components can be produced using the above-described punch rivet, the upper components being punched by the punch rivet and the bottom component receiving the front cutting edge in widened form. The two cutting edges are radially widened to substantially the same extent such that the back cutting edge, that is the cutting edge remote from the front cutting edge, conically widens the punched hole in the top component and is positively riveted with this widening. The thus widened cutting edge represents the end of a conical widening of the rivet shank which therefore forms a rivet head which can be widened without particularly high pressure, as this widening is not prevented by transverse connections over the rivet shank of the type found in the case of known punch rivets with a lid-like head.

The piece punched from the upper component or components can be fastened in the rivet shank by axial compression. This is advantageous because, on the one hand, the two sides of the riveted joint are separated in an impervious manner, which prevents the penetration of sprayed water and the like in the car industry, for example, and, on the other hand, an uncompressed punched-out piece falls from the riveted joint and has to be disposed of somehow so it cannot obstruct subsequent operations in any way.

The riveted joint can be produced particularly advantageously if components made of aluminium sheet are to be riveted and the punch rivet consists of a precipitation-hardened aluminium which is harder than the aluminium sheet. In this case, the entire riveted joint including the components to be riveted consists of the same material which is, in particular, corrosion-resistant and is of particular importance in many cases where corrosion resistance and lightness are paramount.

It is known to use a die and a ram for producing the various riveted joints, the particular feature of the riveting tool used in this connection being that the die as well as the ram have a conical part which fits into the rivet shank and widens the respective cutting edge substantially to the same extent in each case. The conical parts converge with a blunt end to such an extent that these parts of die and ram produce the above-mentioned axial compression of a punched-out piece.

The method of producing the above-mentioned riveted joint is preferably carried out in that a punch rivet is pressed through one or more layers of components, the cutting edges being widened to substantially the same extent and on the one hand penetrating into the bottom component and on the other hand positively enlarging the top component. Riveting is therefore substantially symmetrical on both sides of the riveted joint, in other words the quality of riveting is virtually identical on both sides. The punched-out piece produced during pressing through can be pressed against the die by the relevant part of the ram such that the punched-out piece is fastened in the rivet shank by radial widening.

BRIEF DESCRIPTION OF THE DRAWINGS

The invention will now be described with reference to the accompanying drawings, FIGS. 1a and b are a section and perspective view of a punch rivet in a continuously tubular design;

FIGS. 3a to e show the individual production phases of a riveted joint using the punch rivet;

DETAILED DESCRIPTION OF THE PREFERRED EMBODIMENT

Figure 2A:
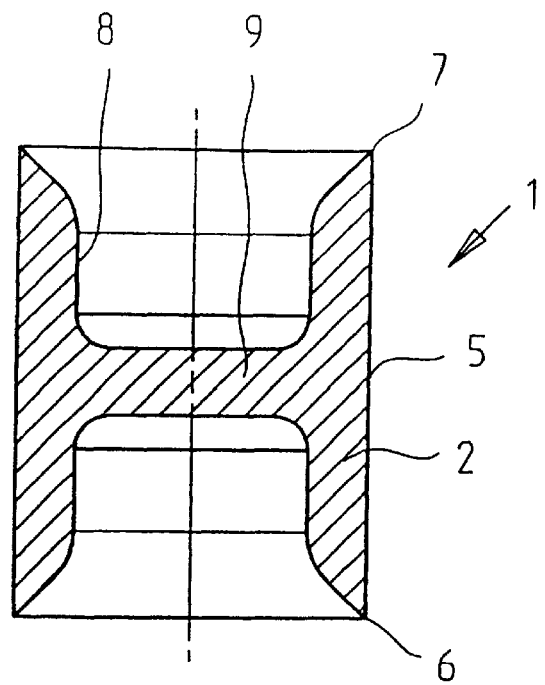
FIGS. 2a and b are a section and perspective view of a similar punch rivet with a radial wall.

FIG. 1a shows a punch rivet 1 of which the rivet shank 2 is designed as a continuously cylindrical tube. The rivet shank 2 has, at either end, a respective internal cone 3, 4 which widens the rivet shank 2 from the interior to the exterior and forms the cutting edge 6 or 7 at the transition into the cylindrically extending outer face 5.

The punch rivet 1 therefore has, over the majority of its inner face 8 and its outer face 5, a continuously cylindrical configuration which ends axially symmetrically in the two cutting edges 6 and 7.

FIG. 1b is a perspective view of the punch rivet 1 shown in section in FIG. 1a.

FIG. 2a shows a similar punch rivet 1 to FIGS. 1a and b, but with a radial wall 9 by which the two ends of the punch rivet 1 with the cutting edges 6 and 7 are separated from one another in a sealed manner. Apart from the partition wall 9, the punch rivet is identical to that in FIG. 1.

Figure 2B:
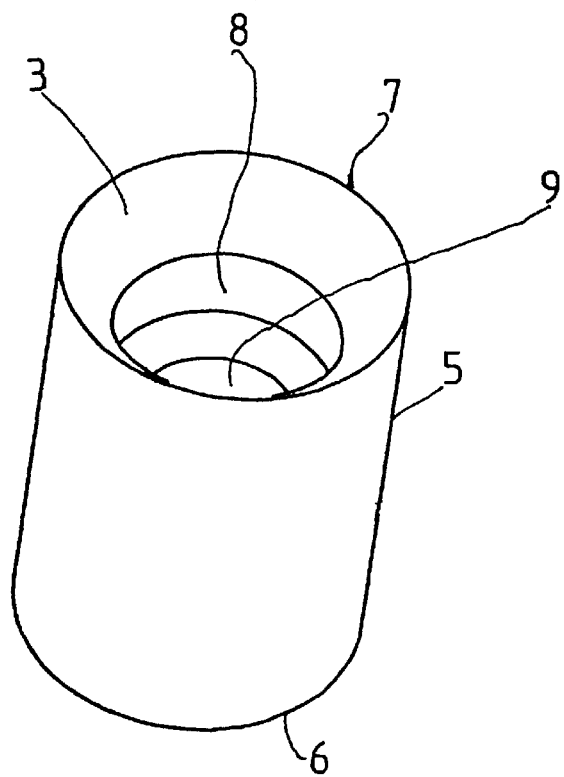

FIG. 2b is a perspective view of the punch rivet according to FIG. 2a.

The processing of a punch rivet according to FIG. 1 will now be described with reference to FIGS. 3a to e.

In FIG. 3a, the punch rivet 1 is held in a tool by the two jaws 10, more specifically while applying the ram 11 to the back of the punch rivet 1. The ram 11 is guided through the guide 12. The plate-like components 13 and 14 to be riveted, which are fixed by holding members which are of no interest in this connection, are held opposite this tool comprising the parts 10, 11 and 12. On the side remote from the punch rivet 1 there is arranged the die 15 relative to which the components 13 and 14 are supported during the punching and riveting process described hereinafter.

In the following phase of operation shown in FIG. 3b, the ram 11 presses the punch rivet 1 toward the component 13 resting against the die 15 via the component 14 therebelow, the punch rivet 1 being guided by the jaws 10.

The punch rivet 1 is now pressed into the component 13 by an advance movement of the ram 11 in the direction of the arrow, the jaws 10 initially still guiding the punch rivet 1 (FIG. 3b). This pressure, which is exerted on the punch rivet 1 by the ram 11, is transmitted in that the ram 11 on its side facing the punch rivet 1 ends in a conical part 16 which fits into the punch rivet 1 and rests tightly against the conical inner face 3 (see FIG. 1) of the punch rivet 1. With its cutting edge 6 (see FIG. 1) the punch rivet 1 penetrates the workpiece 13 which is deformed in the direction of the die 15 and pushes the workpiece 14 forward. This process is brought about by the configuration of the die 15 on its side which faces the punch rivet 1 and ends in a conical part 17 like the ram 11. In addition to the conical part 17, the die 15 has the shaped pocket 18 which encircles the conical part 17 and into which the material of the component 14 is shaped when the punch rivet 1 is pressed in. The jaws 10 are retracted in the direction of the arrows as penetration of the punch rivet 1 into the component 3 progresses.

FIG. 3d shows the following phase of operation in which the punch rivet 1 is pressed right through the component 13 and has punched the punched-out piece 19 from the component 13. In this phase of operation, the jaws 10 have released the punch rivet 1 so the ram 11 can drop right onto the component 13, guided by the guide 12. The regions of the punch rivet 1 with the cutting edges 6 and 7 (see FIG. 1) widen substantially to the same extent and virtually symmetrically to one another during this process, the cutting edge widening conically at the face of the punch rivet 1 (cutting edge 6 in FIG. 1) due to the conical part 17 and penetrating into the material of the component 14 without perforating it. The punch rivet 1 is thus riveted to the component 14. On the back of the punch rivet 1, the conical part 16 of the ram 11 also conically widens the punch rivet 1 which can be widened in the manner illustrated without particularly great forces as this widening is not prevented by transverse connections in the punch rivet of the type found in the state of the art owing to the lid-like head, due to the absence of these connections. As is shown clearly in FIG. 3d, the surrounding material of the component 13 is also deformed by this widening of the back of the punch rivet 1 and is pressed toward the component 14, resulting in riveting, more specifically riveting to the component 13, on the back of the punch rivet 1. The process of widening of the back of the punch rivet 1 is crucial here as the surrounding material of the component 13 inevitably has to follow this widening. The material of the component 13 is applied to the entire deformed surface of the punch rivet 1 because, on the one hand, the material of the punch rivet 1 is adapted to the sheared edge in the component 13 during its radial widening and the material of the component 13 in turn follows the radial widening of the punch rivet 1 resulting in reciprocal deformation which extends over a large area and allows intimate connection between the material of the punch rivet 1 and the material of the component 13. This results in a particularly secure rivet joint which is capable of absorbing corresponding forces higher than the forces to be transmitted by the known heads of known punch rivets.

The piece 19 punched out with these punch rivets is finally compressed by the conical parts 16 and 17 so it has to widen radially. This is axial compression which causes the punched-out piece to be pressed radially to a considerable extent against the inner face of the punch rivet 1, securing the punched-out piece 19 in the rivet shank of the punch rivet 1.

On completion of riveting according to FIG. 3d, the tool parts are driven apart with the ram 11 and the die so that, as shown in FIG. 3e, the riveted components 13 and 14 are released.

Figure 4:
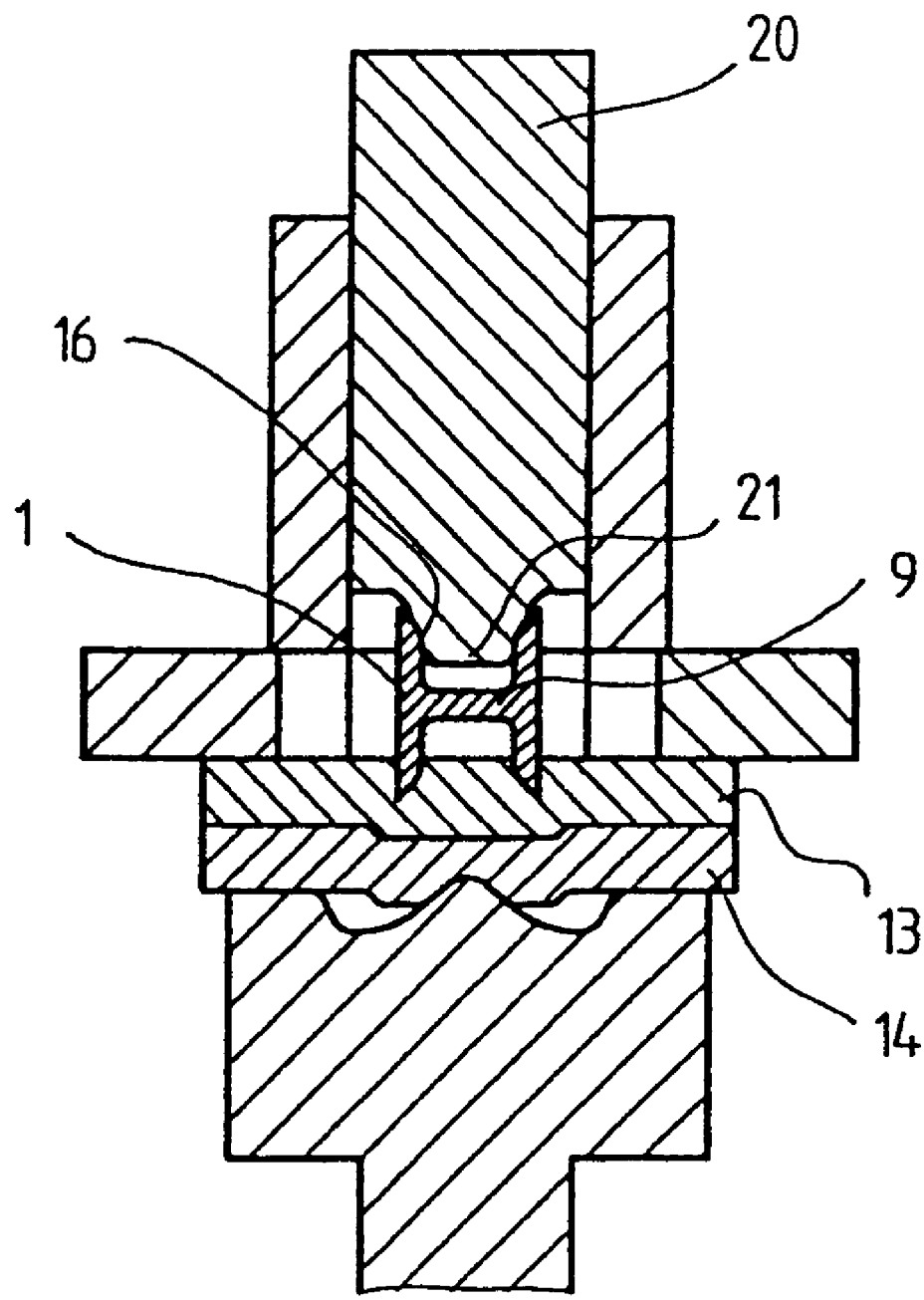
FIG. 4 shows the production phase according to FIG. 3c with a punch rivet having a radial wall.

Basically the same procedures take place during the processing of a punch rivet according to FIG. 2 with the radial wall 9 as shown in FIGS. 3a to 3e. As shown in FIG. 4, however, the necessary axial compression of the punched-out piece produced is achieved using a ram 20 of which the conical part 16 has an extension 21 which is finally pressed against the radial wall 9 during the riveting process. Once the component 13 has been punched through and the front of the punch rivet 1 has been riveted in the component 14, the punched-out piece located between the radial wall 9 and the riveted component 14 (not shown in FIG. 4) is compressed axially so as to be secured in the punch rivet 1.

Figure 5:
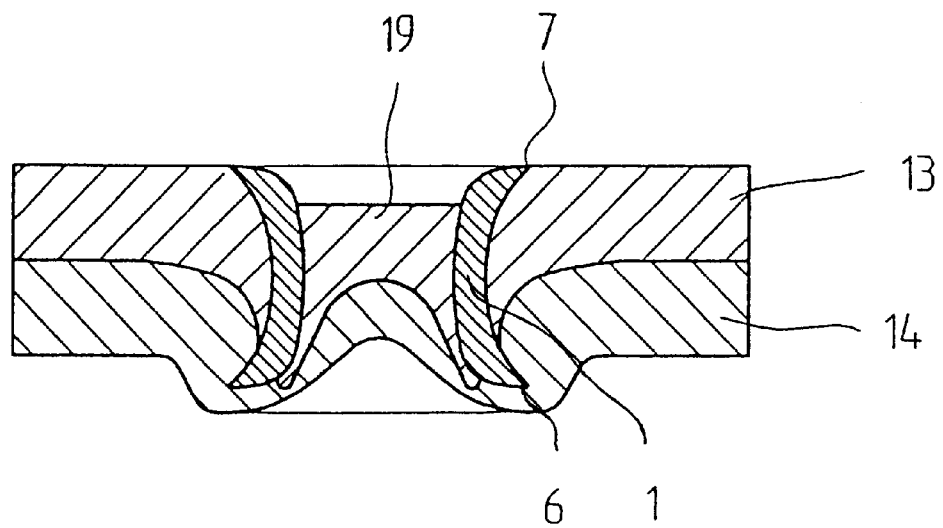
FIG. 5 is an enlarged view of the riveted joint produced in this way.

FIG. 5 is an enlarged view of the riveted joint produced by the operating phases shown in FIGS. 3a to 3e. FIG. 5 shows clearly that the material of the component 13 has been deformed in continuous contact with the external surface of the deformed punch rivet owing to the widening of the punch rivet in the region of the back cutting edge 7, the material of the component 13 inevitably having been shaped to the widened configuration of the punch rivet particularly in the region of the cutting edge 7 and then away from the cutting edge, producing a very close connection between component 13 and the punch rivet in this region which is particularly critical for the strength of the riveted joint. The component 13 can obviously be replaced by several plate-like components.

Figure 6:
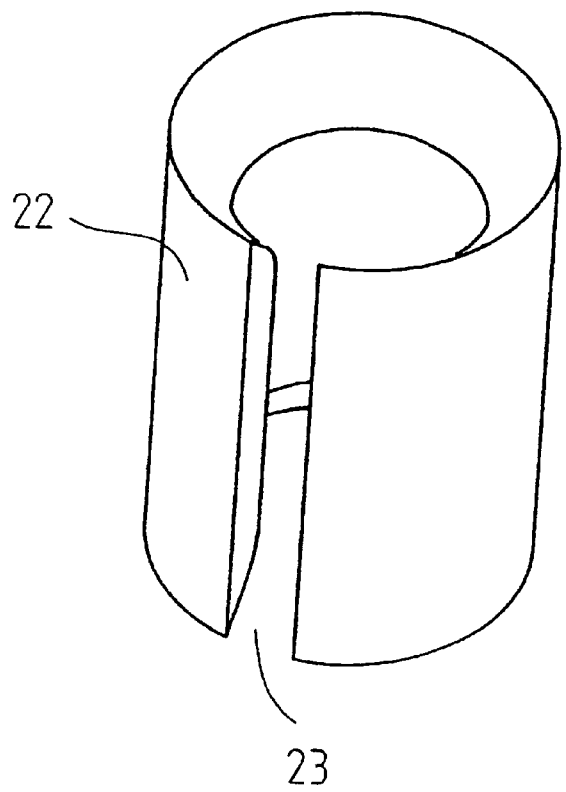
FIG. 6 shows a punch rivet with an axially continuous slot.

FIG. 6 shows a variation of the punch rivet according to FIG. 1 relating to a rolled sheet metal blank rivet 22 which leaves the slot 23 open at its axial butt joint. During the processing of such a punch rivet 22 in the context of the operating phases shown in FIGS. 3a to 3e, material flows from the components to be riveted into the slot 23 which is therefore prevented from twisting relative to either component so the riveted components are prevented from twisting overall. The punch rivet 22 according to FIG. 6 is riveted in the manner shown in FIGS. 3a to 3e.

Figure 7:
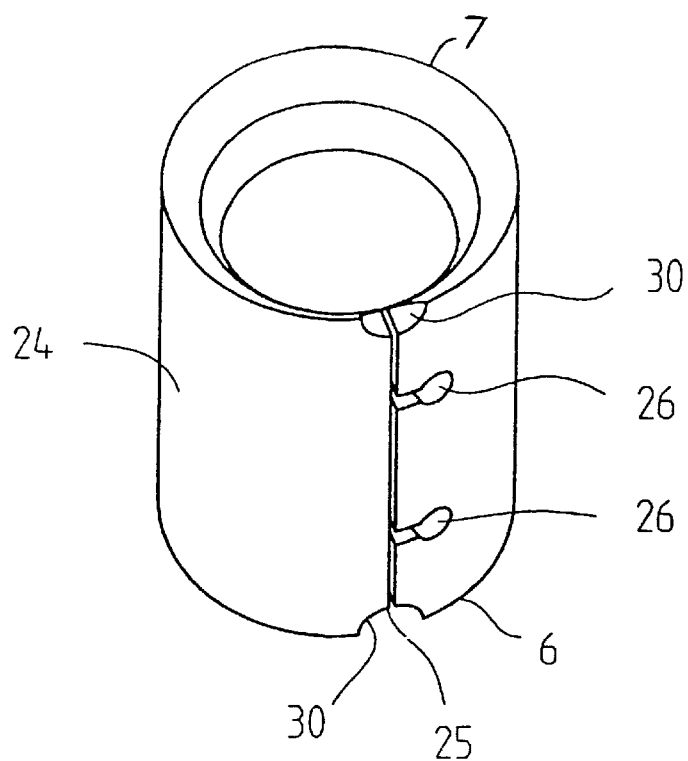
FIG. 7 shows a punch rivet consisting of a rolled sheet metal blank with fasteners bridging the butt joint.

FIG. 7 shows a punch rivet which also consists of a rolled sheet metal blank 24 and in which the axial butt joint is virtually closed. To prevent this punch rivet 24 from possibly spreading apart when it is being riveted in accordance with the operating phases shown in FIGS. 3a to 3e, there are provided the fasteners 26 which end in widenings which fit in corresponding recesses in the punch rivet 24. These recesses have corresponding undercuts so the fasteners 26 are held tightly in the recesses, preventing the punch rivet 24 from spreading apart along the butt joint 25 when being processed.

The punch rivet 24 according to FIG. 7 is also provided with recesses 30 at its cutting edges 6 and 7. These recesses allow the penetration of material from the components to be riveted during the riveting of the punch rivet 24, and this prevents twisting. These recesses can obviously be provided in all illustrated embodiments of the punch rivet.

Figure 8:
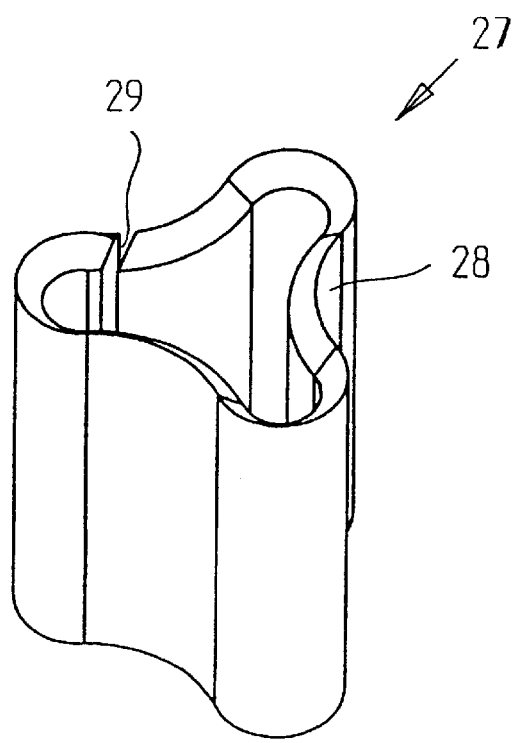
FIG. 8 shows a punch rivet with axial corrugation.

FIG. 8 is a plan view of a punch rivet 27 having axially extending corrugations 28. The punch rivet 27 is produced from a sheet metal blank, the butt joint being formed by reciprocal bevels to prevent thickening of the wall of the punch rivet 27 owing to the resultant overlap. After being riveted in accordance with the operating phases shown in FIGS. 3a to 3e, the punch rivet 27 allows particularly pronounced twist prevention as the corrugations 28 make twisting without destroying the riveted joint virtually impossible.

What is claimed is:

1. A punch rivet comprising:

a rivet shank having an axis, an outer face and an inner face; and cutting edges arranged on each end face of the rivet shank;

the outer face extending continuously parallel to the axis over the entire rivet shank;

the punch rivet having the same cutting edges on either end in an axially symmetrical design in the form of a tube; and the cutting edges and ends of the rivet shank being outwardly expanded away from the axis when fastening.

2. The punch rivet according to claim 1, wherein the outer face is continuously cylindrical prior to fastening.

3. The punch rivet according to claim 1, wherein the rivet shank is axially corrugated in cross section.

4. The punch rivet according to one of claims 1 to 3, wherein the rivet shank is a continuous and hollow tube.

5. The punch rivet according to one of claims 1 to 3, wherein the rivet shank has a radial wall between the cutting edges.

6. The punch rivet according to claim 2, wherein the rivet shank is made from a rolled sheet metal blank with an axial butt joint.

7. The punch rivet according to claim 1, wherein the rivet shank has an open slot.

8. The punch rivet according to one of claims 1 to 3, wherein seam edges of the shank overlap each other.

9. The punch rivet according to one of claims 1 to 3, further comprising fasteners bridge a seam in the rivet shank.

10. The punch rivet according to one of claims 1 to 3, wherein the cutting edges are interrupted by recesses.

11. A riveted joint between at least two plate-like components of which the upper component or components are punched by a punch rivet according to claim 1 and the bottom component receives the end-face cutting edge in widened form, wherein the two cutting edges are radially widened substantially to the same extent such that the rear cutting edge conically widens the punched hole in the top component and is positively riveted with this widening.

12. The riveted joint according to claim 11, wherein the piece punched from the upper component or components is fastened in the rivet shank by axial compression.

13. The riveted joint according to claim 11, wherein the components are formed by aluminum sheets and the punch rivet consists of a precipitation hardened aluminum which is harder than the aluminum sheet.

14. A riveting tool for producing a riveted joint according to claim 11 with a die and a ram, wherein each of the die and the ram have a conical part which fits into the rivet shank and widens the respective cutting edge substantially to the same extent in each case.

15. A method of producing a riveted joint according to claim 11 with a riveting tool according to claim 14, wherein the punch rivet is pressed through one or more layers of components, the cutting edges are widened substantially to the same extent and on the one hand penetrate into the bottom component and on the other hand positively enlarge the top component.

16. The method according to claim 15, wherein the ram presses the punched-out piece produced by pressing through against the die such that the punched-out piece is fastened in the rivet shank by radial widening.

17. A rivet comprising:
a shank having an outer face and an inner face, the faces being substantially cylindrical and parallel prior to fastening;
the shank having opposite ends which are openly accessible and hollow; and
tapered cutting edges located at the opposite ends.

18. The rivet of claim 17 wherein one of the cutting edges self pierces and diverges upon fastening.

19. The rivet of claim 17 wherein the ends of the shank are outwardly curved away from a centerline of the shaft when fastened to a component.

20. The rivet of claim 17 further comprising a radial wall located in the shank between the ends, the shank and radial wall defining a substantially H-like cross-sectional shape.

21. The rivet of claim 17 wherein the shank has an axially elongated slot, and edges of the shank adjacent and parallel to the slot are spaced away from each other.

22. The rivet of claim 17 wherein one of the tapered ends of the shank is not exposed once fastened.

23. A rivet comprising:
a shank having a corrugated shape;
a first tapered cutting edge located at an end of the shank; and
a second tapered cutting edge located at an end of the shank opposite the first tapered cutting edge.

24. The rivet of claim 23 wherein the ends of the shank are openly accessible.

25. The rivet of claim 24 wherein the shank is entirely hollow.

26. The rivet of claim 23 where in the shank is corrugated in an elongated and axial direction.

27. The rivet of claim 23 wherein the shank has at least three alternating lobes and depressions.

28. The rivet of claim 23 further comprising a radial wall located in the shank between the ends, the shank and radial wall defining a substantially H-like cross-sectional shape.

29. The rivet of claim 23 wherein the shank has an axially elongated slot, and edges of the shank adjacent and parallel to the slot are spaced a way from each other.

30. A rivet comprising:
a shank having an outer face and an inner face, the faces being substantially cylindrical and parallel prior to fastening;
the shank having opposite ends which are openly accessible and hollow;
tapered cutting edges located at the opposite ends, at least one of the cutting edges self pierces and diverges upon fastening;
the ends of the shank are outwardly curved away from a centerline of the shaft if fastened to a component; and
a radial wall located in the shank between the ends, the shank and radial wall defining a substantially H-like cross-sectional shape.

31. A method of producing a joint between multiple sheets with a rivet, the method comprising:
(a) piercing a first of the sheets with a cutting edge of the rivet;
(b) piercing a portion of a second of the sheets with the cutting edge of the rivet;
(c) preventing the cutting edge of the rivet from completely piering the second sheet; and
(d) outwardly expanding both opposite ends of the rivet.

32. The method of claim 31 further comprising orienting either end of the rivet against the first sheet and then pushing the rivet into engagement with the sheets which are unpierced at the joint prior to rivet engagement.

33. The method of claim 31 further comprising creating the rivet to be entirely hollow with open ends prior to engagement with the sheets.

34. The method of claim 31 wherein the end of the rivet adjacent a ram is inserted into the first sheet to a depth such that it does not substantially project beyond an exposed ram-side surface of the first sheet after insertion.

35. The method of claim 31 further comprising creating tapered cutting edges adjacent both ends of the rivet.

36. The method of claim 31 further comprising giving the outer surface of the rivet an uninterrupted cylindrical shape prior to fastening.

37. The method of claim 31 further comprising retaining a pierced portion of the first sheet inside of the rivet when the rivet is fastened to the sheets.

* * * * *